United States Patent [19]

Fidler et al.

[11] Patent Number: 4,834,461

[45] Date of Patent: May 30, 1989

[54] CONTROL SYSTEM FOR A MULTIPLE SHANK IMPACT RIPPER

[75] Inventors: Jerry D. Fidler, East Peoria; John J. Krone, Dunlap; Michael A. Roussin, Peoria, all of Ill.

[73] Assignee: Caterpillar Inc., Peoria, Ill.

[21] Appl. No.: 122,157

[22] Filed: Nov. 18, 1987

[51] Int. Cl.[4] .............................................. A01B 35/00

[52] U.S. Cl. ............................... 299/37; 37/DIG. 18; 172/2; 172/4; 172/7; 172/12

[58] Field of Search ............... 299/1, 37; 37/DIG. 18; 172/2, 4, 4.5, 7, 9, 10, 11, 12

[56] References Cited

U.S. PATENT DOCUMENTS

| | | | |
|---|---|---|---|
| 4,031,964 | 6/1977 | Takahashi et al. | 172/12 X |
| 4,044,838 | 8/1977 | Wooldridge | 172/4 X |
| 4,229,044 | 10/1980 | Cobb et al. | 299/37 |
| 4,529,039 | 7/1985 | Sakundiak | 172/7 X |
| 4,630,676 | 12/1986 | Long, Jr. | 175/77 X |

*Primary Examiner*—William P. Neuder
*Attorney, Agent, or Firm*—John W. Grant

[57] ABSTRACT

Impact rippers are useful for ripping solid rock. The service life of the impactor can be extended if the impactor is operated only when the ripper shank is loaded sufficient to transmit the impact energy into the material being ripped. The subject control system uses control signals generated by a plurality of signal generating means when the ripper shanks are loaded above a predetermined level to control the operation of the hydraulically actuated impactors associated with such ripper shanks. The number of control signals being generated is also used to control the volume of fluid made available for use by the impactors being operated at an given time to control the operating speed thereof. Thus, only the impactor(s) associated with a ripper shank(s) loaded above the predetermined level is operated thereby avoiding non-productive and harmful impactor operation if the ripper shank(s) is not sufficiently loaded.

36 Claims, 4 Drawing Sheets

Fig. 1
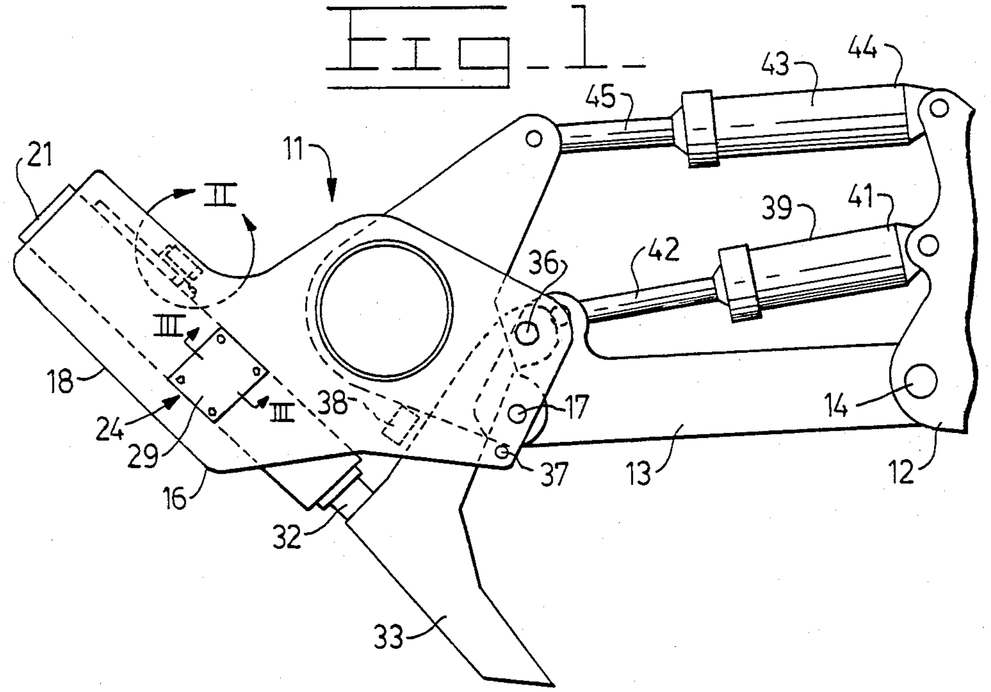
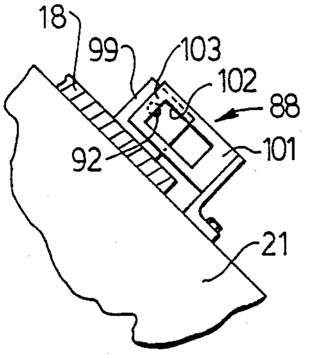
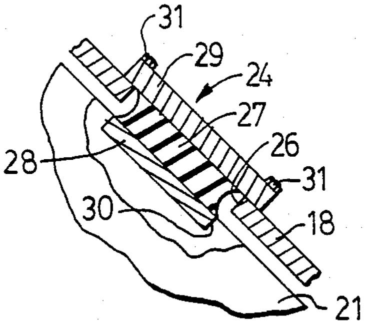
Fig. 2
Fig. 3

CONTROL SYSTEM FOR A MULTIPLE SHANK IMPACT RIPPER

TECHNICAL FIELD

This invention relates to a control system for multiple shank impact ripper and more particularly to a system to actuate each hydraulic impactor only if the associated ripper shank is loaded greater than a predetermined level.

BACKGROUND ART

It is known that the life expentancy of the impactor of an impact ripper is increased by having the hydraulic impactor deliver impact blows to the ripper shank only when the ripper shank is loaded above a predetermined level so the impact energy is substantially fully transmitted into the material being ripped. If the ripper shanks are not sufficiently loaded, the impact energy is absorbed by the impactor and/or ripper structure and leads to early failures thereto. A previous control system for a single shank impact ripper determines the load on the ripper shank by sensing the hydraulic pressure in a hydraulic cylinder used to control the pitch of the ripper shank. If the hydraulic pressure of the hydraulic cylinder is below a predetermined level, the hydraulic impactor cannot be automatically activated. Also, that system has single pump dedicated to the hydraulic impactor at least when the impactor is in operation so that operating speed of the impactor is a function of the output of the pump. While that system was acceptable for an impact ripper having a single shank and single hydraulic impactor, it is not acceptable for use with an impact ripper having a plurality of shanks and hydraulic impactors wherein the position of all the ripper shanks is controlled by one or more common hydraulic cylinders working in unison. Moreover, that system was not capable of controlling the output flow from a pair of pumps necessary for the operation of a plurality of hydraulic impactors.

The present invention is directed to overcoming one or more of the problems as set forth above.

DISCLOSURE OF THE INVENTION

In one aspect of the present invention, a control system is provided for an impact ripper having a frame, a plurality of laterally spaced hydraulic actuated impactors connected to the frame with each impactor having a moveable impact element, and a plurality of ripper shanks connected to the frame for limited fore and aft movement relative thereto. Each of the shanks is individually associated with one of the impactors and positioned to engage that impactor when a load is imposed on the ripper shank and to receive impact blows from the impact element. The control system comprises a source of pressurized fluid, a supply conduit connected to the source of pressurized fluid, a plurality of signal generating means with each being individually operatively associated with a respective one of the ripper shanks for generating a control signal when a load greater than a predetermined level is applied to that ripper shank, and a means responsive to the discrete control signals from the generating means for controlling communication of fluid from the supply conduit to the impactors so that only the impactor(s) associated with the ripper shank(s) having force greater than the predetermined level applied thereto receives (receive) fluid from the supply conduit.

The present invention relates to a control system in which a discrete control signal is generated when each of the individual ripper shanks of a multiple shank impact ripper is loaded to a level greater than a predetermined level. The discrete signal or signals are then used firstly to actuate only the control valve or valves connected to the hydraulic impactor associated with the ripper shank or shanks loaded above the predetermined level and secondly to control the fluid flow from a source of pressurized fluid so that only a first preselected volumetric output is available to the impactor control system when only one signal is present and a second preselected volumetric output is available when more than one signal is present.

BRIEF DESCRIPTION OF THE DRAWINGS

FIG. 1 is a side elevational view of an embodiment of the present invention.

FIG. 2 is a somewhat enlarged portion encircled by the line II of FIG. 1.

FIG. 3 is a sectional view taken along line III—III of FIG. 1.

BEST MODE FOR CARRYING OUT THE INVENTION

Figure 4:
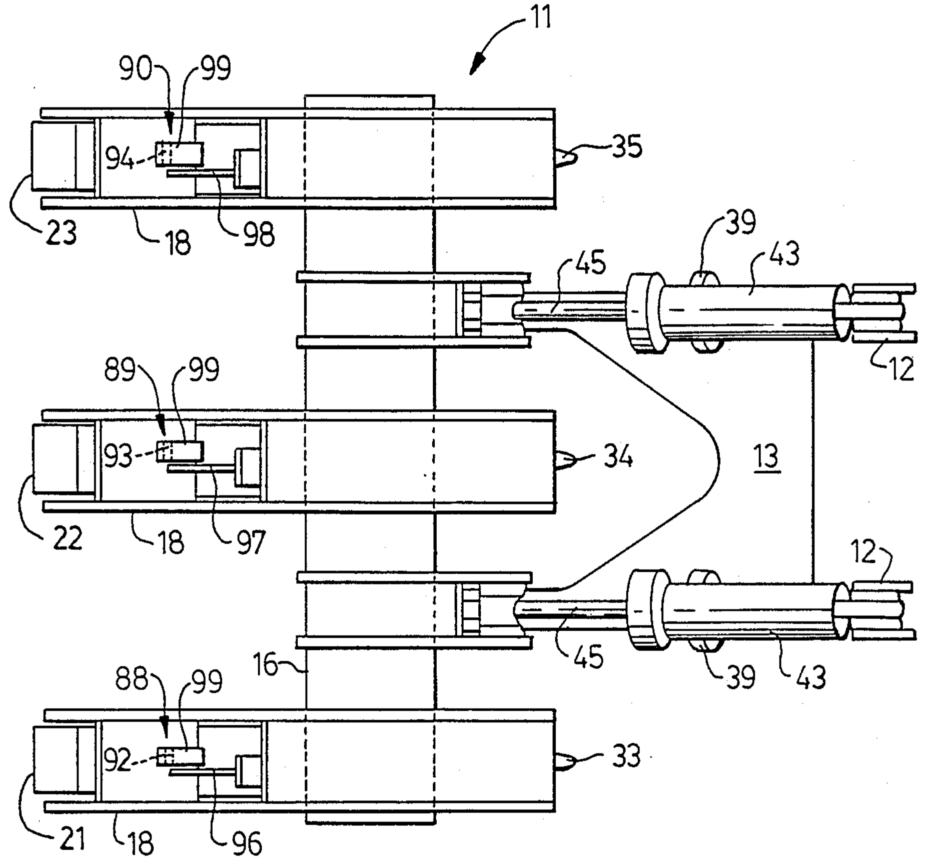
FIG. 4 is a top plan view of FIG. 1.
Figure 5A:
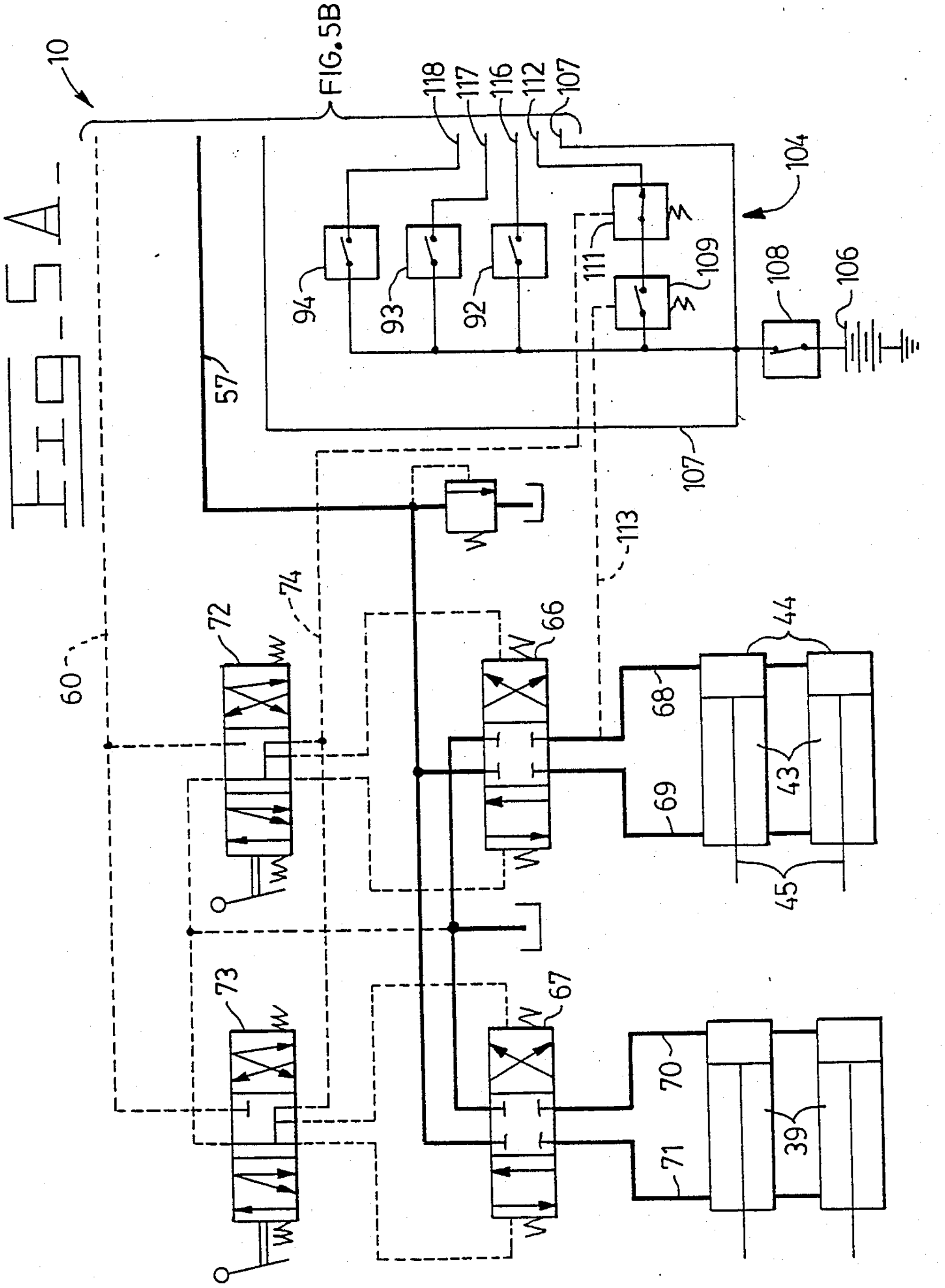
FIGS. 5*a* and 5*b* is a schematic illustration of the control system of the present embodiment.
Figure 5B:
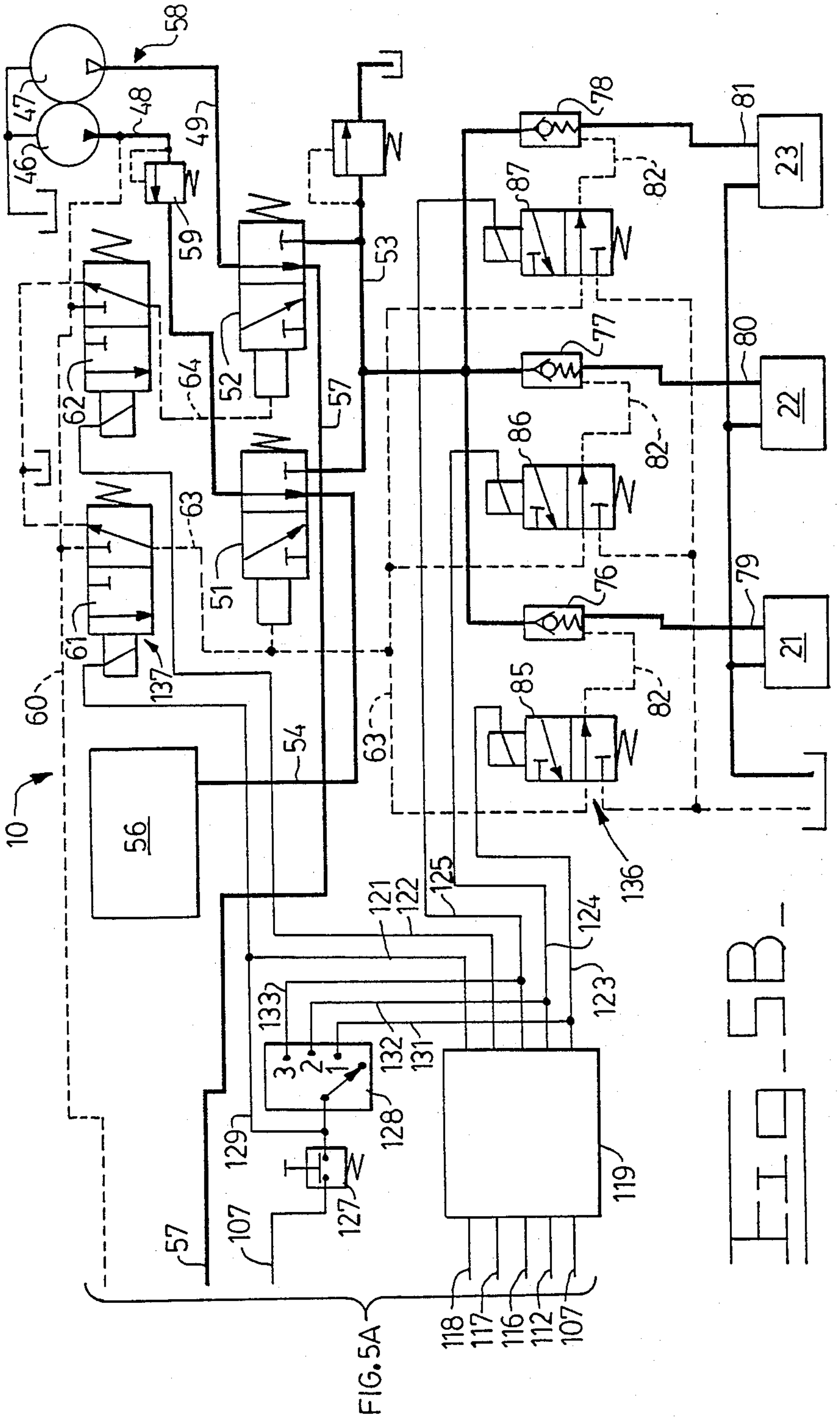

A control system 10 is shown in FIGS. 5*a* and 5*b* for controlling the operation of a multiple shank impact ripper 11 shown in FIGS. 1 through 4. The impact ripper 11 includes a mounting bracket 12 adapted to be connected to a track type tractor or other towing vehicle. A rearwardly extending linkage 13 is pivotally connected to the mounting bracket 12 at a pivot 14. A frame 16 is pivotally connected at a pivot 17 to the distal end of the linkage 13 and includes a plurality of laterally spaced support bracket assemblies 18. A plurality of hydraulically actuated impactors 21,22,23, are individually slidably positioned within the support bracket assemblies 18 and are connected to the respective support bracket assembly by a pair of resilient couplings, one shown at 24 in FIGS. 1 and 3, at opposite sides of the impactor. As best shown in FIG. 3, each of the couplings extend through an opening 26 in the associated support bracket assembly 18 and includes an elastomeric pad 27 bonded between a pair of support plates 28 and 29. The support plate 28 is seated within a socket 30 in the respective impactor and the support plate 29 is suitably connected to the support bracket assembly by a plurality of bolts 31. Each of the impactors 21–23 of this embodiment are hydraulic hammers having an impact element 32 driven in a rectilinear direction.

A plurality of ripper shanks 33,34,35 are pivotally connected to the support brackets 18 of the frame 16 at pivots, one of which is shown at 36. Each of the ripper shanks 33,34,35 is individually associated with one of the impactors 21,22,23 and positioned to engage that impactor when a load or force is imposed on the ripper shank in a rearward direction and to receive impact blows from the impact element 32. First and second fixed stops 37,38 are positioned in front of and in back of respectively each ripper shank to limit fore and aft movement of the ripper shank.

The elevational position of the impact ripper 11 is controlled by a pair of hydraulic cylinders 39 each having a head end 41 connected to the mounting bracket 12 and a piston rod 42 connected to the linkage 13. The angle of the ripper shanks 33,34,35 is controlled by a pair of hydraulic cylinders 43 each having a head end 44 connected to the mounting bracket 12 and a piston rod connected to the frame 16.

As more clearly shown in FIGS. 5*a* and 5*b* the control system 10 includes first and second fixed displacement pumps 46 and 47 connected to output conduits 48 and 49 respectively. The displacement of the second pump 47 is about twice that of the first pump 46. A first pilot operated selector valve 51 is connected to the output line 48 and a second pilot operated selector valve 52 is connected to the output conduit 49. A common supply conduit 53 is connected to both of the selector valves 51 and 52. An implement supply conduit 54 is connected to the first selector valve 51 and to an implement circuit 56. Another implement supply conduit 57 is connected to the second selector valve 52. Both of the selector valves are shown in a first operating position at which the output conduits 48 and 49 are in communication with the implements supply conduits 54 and 57 respectively. Each of the selector valves is moveable to a second operating position at which the output conduits 48 or 49 are in communication with the common supply conduit 53.

The fixed displacement pumps 46,47 and the first and second valves 51,52 provide a source 58 of pressurized fluid having first and second preselected volumetric output flow rates. Alternatively, the two pumps and the selector valves can be replaced with a variable displacement pump having at least two preset displacement settings.

A restrictor valve 59 is positioned within the output conduit 48 between the first pump 46 and the first selector valve 51 to maintain fluid pressure in the output conduit 48 upstream thereof above a predetermined pressure level. A pilot supply line 60 is connected to the output conduit 48 upstream of the restrictor 58 and serves as a source of pressurized pilot fluid.

A pair of solenoid actuated pilot valves 61,62 are connected to the pilot supply line 60 and are individually connected to the first and second selector valves 51 and 52 through pilot lines 63 and 64 respectively. The pilot valves 61 and 62 are shown in a first operating position at which the pilot line 63,64 are connected to the tank. Each of the pilot valves is moveable to a second operating position at which the pilot line 60 is communicated with the respective pilot line 63 and 64.

A pair of pilot operated directional control valves 66,67 are connected to the implement supply conduit 57. The directional control valve 66 is connected to the head end and rod end respectively of the hydraulic cylinders 43 through a pair of cylinder conduits 68,69. Similarly, the directional control valve 67 is connected to the opposite ends of the hydraulic cylinders 39 through a pair of cylinder conduits 70,71. Each of the directional control valves is shown in its neutral position at which communication between the implement supply conduit 57 and the respective pair of hydraulic cylinders 39,43 is blocked and the opposite ends of the pair of cylinders are isolated from each other. Each of the directional control valves is moveable leftwardly to a first operating position at which fluid is directed to the respective pair of hydraulic cylinders to cause extension thereof and moveable rightwardly to a second operating position at which pressurized fluid is directed to the respective hydraulic cylinders to cause retraction thereof.

A pair of manually operated pilot valves 72,73 are connected to the pilot supply line 60 with each pilot valve being connected to opposite ends of one of the directional control valves 66,67. A pilot fluid signal line 74 is also connected to both of the pilot valves 72,73 for a later defined purpose. In the position shown, each of the pilot valves blocks communication of pressurized pilot fluid from the ends of the respective directional valves 72,73. Each of the pilot valves is moveable rightwardly to a first operating position at which pressurized pilot fluid is communicated to the right end of the respective directional control valve to move it to its first position and moveable leftwardly to a second operating position at which pressurized pilot fluid is communicated to the left end of the respective directional valve to move it to its second position. At both operating positions of the pilot valves, pressurized pilot fluid is communicated to the signal line 74.

The control system 10 further includes a plurality of control valves 76,77,78, connected to the common supply conduit 53 and to the hydraulically actuated impactors 21,22,23 through a plurality of conduits 79,80,81. The control valves in this embodiment are pilot actuated poppet valves and have a pilot line 82 connected thereto. Each of the control valves 76,77,78 is maintained in a fluid blocking condition when pressurized pilot fluid is present in the pilot line 82 and is moved to an open position by the fluid in the common supply conduit when no pressurized pilot fluid is present in the pilot line 82.

A plurality of solenoid actuated pilot valves 85,86,87 are each connected to a respective one of the pilot lines 82 and to the pilot line 63. The pilot valves 85,86,87 are shown in a first operating position at which the pilot line 63 is in communication with the pilot line 82. Each of the pilot valves 85,86,87 is movable to a second operating position at which communication between the pilot lines 63 and 82 is blocked and the pilot line 82 is vented to the tank.

As more clearly shown in FIGS. 1,2 and 4, the control system includes a plurality of signal generating means 88,89,90, each of which is individually, operatively associated with one of the impactors 21,22,23 for generating a control signal when a force greater than a predetermined level is applied to the ripper shank 33,34 or 35 associated with that impactor. Each of the signal generating means 88,89,90 includes a normally open proximity switch 92,93,94 and a target 96,97,98. Each of the proximity switches is suitably mounted in a nonmagnetic block 99 suitably connected to the respective support bracket assembly 18. The targets 96,97,98 are suitably connected to the impactors 21,22,23 and as best shown in FIG. 2 include a target plate 101 disposed substantially parallel to the impactor. The plate includes a window 102 therein and a cross bar 103 which, in the position shown, is in close proximity to the associated proximity switch 92,93 or 94.

The proximity switches 92,93,94 are part of an electrical control circuit 104 which includes a source of electrical energy such as a battery 106 connected to a main electrical line 107 through a disconnect switch 108. A normally open pressure switch 109 and a normally closed pressure switch 111 are serially connected between the main line 107 and a signal line 112 connected to a logic relay means 119. The pilot fluid signal line 74 is connected to the pressure switch 111. Another pilot fluid signal line 113 is connected to the pressure switch 109 and to the cylinder conduit 68. The main line 107 is also connected to all the proximity switches 92,93,94 and the logic relay means 119. A plurality of control signal lines 116,117,118 are individually connected to the proximity switches and to the logic relay means 119. A plurality of activating signal lines 121,122,123,124,125 are connected to the logic relay means 119 and to the solenoid actuated pilot valves 61,62,85,86 and 87 respectively. Alternatively, the pressure switch 109 may be omitted with the main line 107 being connected directly to the pressure switch 111.

The control circuit 104 also includes a manually actuated trigger switch 127 connected to the line 107 and to a manually rotatable selector switch 128 through a line 129. The line 129 is also connected to the actuating signal line 121. A plurality of electrical lines 131,132,133 are connected to the selector switch 128 and to the actuating signal lines 123,124 and 125 respectively.

The control valves 76,77,78, the source of pressurized pilot fluid 60, the pilot valves 85,86,87 and the logic relay means 119 constitute, in part, a means 136 responsive to the discrete control signals from the generating means 88,89,90 for controlling communication of fluid from the supply conduit 53 to the impactor 21,22,23 so that only the impactor(s) associated with the ripper shank(s) having a force greater than the predetermined level applied thereto receives (receive) fluid from the supply conduit.

The source of pressurized fluid 60, the pilot valves 61,62 and the logic relay means 119 constitute, in part, a means 137 responsive to the number of control signals being generated by the plurality of generating means 88,89,90 for controlling the volumetric output of the source of pressurized fluid 58 so that only the first preselected volumetric output is communicated to the supply conduit 53 when only one control signal is being generated and the second preselected volumetric output is communicated to the supply conduit 57 when more than one control signal is being generated.

INDUSTRIAL APPLICABILITY

In use, the impact ri per 11 is shown in an operating position at which the r pper shanks 33,34,35 extend into the material to be rip ed. The elevational position or penetration depth of the ripper shanks can be selectively changed by manually moving the pilot valve 73 in the appropriate direction to cause extension or retraction of the hydraulic cylinders 39 in the conventional manner. Similarly, the operating angle of the ripper shanks can be selectively changed by manually moving the pilot valve 72 in the appropriate direction to cause extension or retraction of the hydraulic cylinders 43.

Assume not that the ripper shanks 33,34 and 35 are being pulled rightwardly as viewed in FIG. 1 through the material to be ripped. With reference now specifically to the ripper shank 33 and associated hydraulic impactor 21 it will be noted that the load or force imposed on the ripper shank 33 tends to pivot it clockwise about the pivot 36 so that a force is applied to the hydraulic impactor 21 through the impact element 32. This force applied to the impactor 21 moves it relative to the support bracket assembly 18 of the frame 16 against the resistance imposed by the resilient coupling 24. Such movement of the impactor causes the target 96 of the generating means 88 to move relative to the proximity switch 92. The size and composition of the elastomeric pad 27 of the coupling 24 are selected so that when the load imposed on the ripper shank 33 is above a predetermined level the cross bar 103 of the target plate 101 moves out of range of proximity switch 92 causing the proximity switch to close and send a control signal through the line 116 to the logic relay means 119. If all of the ripper shanks are loaded above the predetermined level as described above with reference to ripper shank 33, all three proximity switches 92,93,94 will be closed and three discrete control signals will be directed through the respective line 116,117 and 118 to the logic relay means 119.

The predetermined level of the load referred to above in this embodiment is approximately 5,000 pounds. When the load on each ripper shank reaches approximately 6,500 pounds, the ripper shanks engage the fixed stops 38 to thereby limit the force applied to the impactors.

The loads acting on the ripper shanks 33,34,35 also tend to pivot the frame 16 about the pivot 17. This causes a buildup of pressure in the head ends 44 of the hydraulic cylinders 43, the cylinder conduit 69, and the pilot signal line 113. When the cumulative load on the ripper shanks exceeds a preselected level, the fluid pressure in the pilot signal line 113 closes the pressure switch 109 which in turn transmits an electrical signal through the closed pressure switch 111 and the line 112 to the relay logic means 119. In this embodiment the pressure switch 109 closes when the cumulative load exceeds about 15,000 pounds which is about three times the predetermined level.

The control system 10 is shown in a condition at which the fluid output of the pump 46 is directed through the first selector valve 51 and is made available to the implement circuit 56 while the fluid output of the pump 47 is directed through the second selector valve 52 into the implement conduit 57 where it is available for use by the cylinders 39 and 43. In the condition shown by the drawings, no fluid is available in the common supply conduit 53 for operating the hydraulic impactors 21,22,23.

During a typical ripping operation of the impact ripper 11, the control system 10 is subjected to basically four distinct operating conditions. The first condition exists when all three of the ripper shanks 33,34,35 are loaded above the predetermined level. In this condition the cumulative load will also be above the preselected level. Thus, the pressure switch 109 will be closed to transmit a signal through the line 112 and all three proximity switches 92,93,94 will be closed so that three discrete control signals will be individually transmitted through the respective leads 116,117, and 118 to the logic relay means 119. The logic relay means 119 reacts to the presence of a signal in line 112 and the three discrete control signals in the lines 116,117 and 118 by automatically directing actuating signals through all five of the signal lines 121–125. The signals in the lines 121 and 122 energizes both solenoid valves 61 and 62 causing them to move to their second operating position. With the pilot valves in their second operating position, pressurized pilot fluid is directed into the pilot line 63 and 64 thereby shifting the selector valves 51 and 52 to their second operating position at which the output flow from both pumps 46 and 47 is directed into the common supply conduit 53 where it becomes available for use by the control valves 76,77, and 78. Simultaneously, the signals in lines 123-125 energize the solenoid operated pilot valves 85,86, and 87 to their second operating position at which the pilot line 82 are vented to the tank. With the pilot lines 82 vented, all three control valves 76,77,78 are opened to communicate the fluid from the common supply conduit 53 to all three of the hydraulic impactors 21,22,23. Directing fluid to the hydraulic impactors puts them into operation causing the impact elements 32 to deliver impact blows to the respective ripper shanks which in turn delivers impact blows to the material to be ripped. Since all three of the hydraulic rippers are identically constructed, directing fluid from the common supply conduit 53 causes them to operate substantially in unison wherein the impact elements 32 substantially simultaneously deliver impact blows to the respective ripper shank at the same time for increased efficiency.

A second condition exists when one of the ripper shanks, for example shank 33, encounters a fissure or weak area in the material being ripped while the cumulative load on the other two ripper shanks remains above the preselected level of 15,000 pounds. When this happens and the load on the ripper shank 33 drops below the predetermined level, the resilient coupling 24 moves the hydraulic actuator 21 forwardly relative to the support bracket assembly 18 so that the cross bar 103 of the plate 101 of the target 96 moves to a position to cause the proximity switch 92 to open. Opening the proximity switch 92 stops transmission of the control signal through the line 116 to the logic relay means 119. The logic relay means reacts to the absence of the signal from the proximity switch 92 by interrupting the actuating signal through the line 123. This de-energizes the solenoid pilot valve 85 causing it to move to the first operating position at which pressurized pilot fluid from the pilot line 63 is directed through the pilot line 82 to the control valve 76. Communication of fluid through the control valve 76 is thus stopped to thereby stop the operation of the hydraulic impactor 21.

Under the second condition described above, the fluid output of both pumps 46 and 47 is shared by the other two impactors 22,23 still in operation. This increases the rate of flow to both of the hydraulic impactors 22,23 and thereby increases the operating speed thereof. However, in this embodiment the operating speed of the hydraulic impactors 22,23 remain below the rated operating speed and will thus will not be detrimental thereto.

A third operating condition exists when two of the three ripper shanks encounter fissures or weak areas in the material being ripped. For example, assume that the impact ripper 11 is operating in either the first or second condition and both ripper shanks 33 and 34 encounter a fissure and the load on those ripper shanks drop below the predetermined level while the cumulative load on all three ripper shanks remains above the preselected level. As described above, the resilient coupling 24 will move the associated hydraulic impactors 21 and 22 forward causing the targets 96 and 97 to move to a position to cause the proximity switches 92 and 93 to open. Opening the proximity switches 92 and 93 stops the transmission of control signals through the lines 116 and 117. The logic relay means 119 reacts to the absence of the two signals from the proximity switches by simultaneously stopping the transmission of actuating signals through the signal lines 122,123 and 124 thereby de-energizing the solenoid valves 62,85 and 86. De-energizing the solenoid valve 62 causes the selector valve 52 to be moved to the first operating position to block the second pump 47 from the common supply conduit 53 so that only the output from the smaller pump 46 is communicated to the common supply conduit 53. De-energizing the solenoid valves 85 and 86 results in blocking fluid communication through the control valves 76 and 77 so that the flow from the pump 46 is available only to the hydraulic actuator 23 associated with the ripper shank 35 which is still loaded above the predetermined level.

A fourth condition exists when the operator actuates either one of the pilot operated control valves 72 or 73 when the control system is operating in any one of the three conditions described above. When the operator moves either one of the pilot valves 72 and 73 to change the position or angle of the ripper shanks, pressurized pilot fluid is directed through the pilot line 74 to open the pressure switch 111. This stops the transmitting of the signal through the line 112 to the logic relay menas 119. The logic relay means 119 reacts to the absence of the signal in the line 112 by stopping the transmission of signals through the signal lines 121 and 122 to de-energize the solenoid operated valves 61,62 thereby causing the selector valves 51,52 to move to their first operating position. With the selector valves in the first position the fluid output of the pumps 46,47 is blocked from the common supply conduit 53 and is made available for use by the implement circuit 56 and the directional control valves 66,67 for actuation of the hydraulic cylinders 39,43. When the operator returns the actuated pilot valve 72 or 73 to the neutral position, the signal line 74 is vented thereby allowing the pressure switch 111 to close. The control system 10 then resumes its normal operation to control the operation of the impactors 21,22,23 dependent upon the loading on the ripper shanks as previously described.

The operator can also selectively use any of the ripper shanks 33,34,35 in an impact hammer type operation. For example, after an impact ripping pass, occasionally a large rock will be pushed aside rather than being broken. In such case the vehicle is maneuvered so that one of the ripper shanks 33,34 or 35 bears against the top of the large rock. As an example, assume that the operator selects to use the ripper shank 34 for breaking the large rock. The selector switch 128 is manually rotated to the number 2 position and the switch 127 closed. This directs an electrical signal through the lead 129 to energize the solenoid pilot operated valve 61 and through the lines 132 and 124 to energize the solenoid pilot operated valve 86. As previously noted, energizing the solenoid operated pilot valve 61 moves it to the second operating position causing the selector valve 51 to move to its second operating position to direct the output of the small pump 46 into the common output line 53. Energizing the pilot operated solenoid 86 moves it to its second operating position to thus allow the pressurized fluid in the conduit 53 to pass through the control valve 77 to the hydraulic impactor 22 operatively associated with the ripper shank 34. Operation of the hydraulic impactor 22 is stopped by releasing the switch 127 allowing it to move to the open position.

In view of the above, it is readily apparent that the structure of the present invention provides an improved control system for a multiple shank impact ripper in which discrete control signals are generated by the plurality of signal generating means when each of the individual ripper shanks are loaded to a level greater than a predetermined level. Each discrete control signal is used to control the operation of the hydraulic impactor associated with the ripper shank that is loaded above the predetermined level so that the impactor(s) is operated only when the associated ripper shank(s) is loaded above the predetermined level. Moreover, the control signal or signals are used to control the fluid flow from the source of pressureized fluid so that only a first preselected volumetric output is available to the impactor control system when only one signal is present and a second preselected volumetric output is available when more than one signal is present.

Other aspects, objects and advantages of this invention can be obtained from a study of the drawings, the disclosure and the appended claims.

We claim:

1. A control system for an impact ripper having a frame, a plurality of laterally spaced hydraulically actuated impactors connected to the frame with each impactor having and impact element, and a plurality of ripper shanks connected to the frame for limited fore and aft movement relative thereto, each of said ripper shanks being individually associated with one of the impactors and positioned to engage that impactor when a force is imposed on the ripper shank and to receive impact blows from the impact element, said control system comprising:

a source of pressurized fluid;

a supply conduit connected to the source of pressurized fluid;

a plurality of signal generating means, each being individually, operatively associated with a respective one of the ripper shanks for generating a control signal when a force greater than a predetermined level is applied to that ripper shank; and means responsive to the discrete control signals from the generating means for controlling communication of fluid from the supply conduit to the impactors so that only the impactor(s) associated with the ripper shank(s) having a force greater than the predetermined level applied thereto receives (receive) fluid from the supply conduit.

2. The control system of claim 1 wherein said communication controlling means includes a plurality of control valves connected to the supply conduit and being individually connected to the hydraulic impactors, each of said control valves being movable between a first posi on at which fluid communication therethrough is t ocked and a second position at which fluid can commu icate therethrough.

3. The control system of claim 2 wherein said control valves are pilot operated control valves moved to the first position by pressurized pilot fluid directed thereto.

4. The control system of claim 3 wherein said communication controlling means includes a source of pressurized pilot fluid and a plurality of pilot valves connected to the source of pressurized pilot fluid and being individually connected to the control valves, each of said pilot valves being movable between a first position at which pressurized pilot fluid is directed to the respective control valve and a second position at which pressurized pilot fluid is blocked from the respective control valve.

5. The control system of claim 4 wherein said pilot valves are solenoid operated pilot valves with each solenoid operated pilot valve being moved to its second position when an actuating signal is directed thereto.

6. The control system of claim 5 wherein said communication controlling means includes logic relay means connected to the plurality of generating means and to the solenoid operated pilot valves for transmitting an actuating signal to energize the appropriate one of the solenoid operated pilot valves when only one control signal is received from the plurality of generating means and for transmitting a plurality of actuating signals to the appropriate ones of the solenoid operated pilot valves when more than one control signal is received from the plurality of generating means.

7. The control system of claim 6 including a source of electrical energy and wherein each of said control signal generating means includes an electrical switch connected to the source of electrical energy and the logic relay means, and a target capable of actuating said switch, one of the switch and the target being mounted on the frame and the other of the switch and target being mounted on the respective impactor.

8. The control system of claim 6 including means for transmitting a signal to the logic relay means only when the cumulative force on the ripper shanks is greater than a preselected level.

9. The control system of claim 1 including a source of electrical energy connected to the signal generating means.

10. The control system of claim 1 wherein said impactors are movably mounted relative to the frame, and including means for resiliently resisting movement of the impactors relative to the frame.

11. The control system of claim 10 wherein said movement resisting means includes an elastomeric coupling connecting a respective one of the impactors to the frame.

12. The control system of claim 11 wherein said predetermined level of force on the ripper shanks is determined by the movement resistance means.

13. The control system of claim 12 wherein the ripper shanks are pivotally connected to the frame, and the frame includes a plurality of stops to limit aft movement of the ripper shanks.

14. A control system for an impact ripper having a frame, a plurality of laterally spaced hydraulically actuated impactors connected to the frame with each impactor having an impact element, and a plurality of ripper shanks connected to the frame for limited fore and aft movement relative thereto, each of said ripper shanks being individually associated with one of the impactors and positioned to engage that impactor when a force is imposed on the ripper shank and to receive impact blows from the impact element, said control system comprising:

a source (58) of pressurized fluid having at least first and second preselected volumetric output flow rates;

a supply conduit connected to the source of pressurized fluid;

a plurality of signal generating means, each being individually, operatively associated with a respective one of the ripper shanks for generating a control signal when a force greater than a predetermined level is applied to that ripper shank; and means responsive to the number of control signals being generated by the plurality of generating means for controlling the volumetric output of the source of pressurized fluid so that only the first preselected volumetric output is communicated to the supply conduit when only one control signal is being generated and the second preselected volumetric output is communicated to the supply conduit when more than one control signal is being generated.

15. The control system of claim 14 wherein said source of pressurized fluid includes a first fixed displacement pump, a first selector valve connected to the first pump and to the supply conduit, a second fixed displacement pump, and a second selector valve connected to the second pump and to the supply conduit, each of said selector valves being movable between a first position at which communication between the respective pump and supply conduit is blocked and a second position at which the respective pump is in communication with the supply conduit.

16. The control system of claim 15 wherein each of said selector valves is pilot operated and is moved to the second position by pressurized pilot fluid directed thereto.

17. The control system of claim 16 wherein said volumetric output controlling means includes a source of pressurized pilot fluid and a pair of pilot valves connected to the source of pressurized pilot fluid and individually connected to the first and second selector valves, each of said pilot valves being movable between a first position blocking fluid communication between the source of pressurized pilot fluid and the respective selector valve and a second position at which the source of pressurized pilot fluid is in fluid communication with the respective selector valve.

18. The control system of claim 17 wherein said pilot valves are solenoid actuated pilot valves and said volumetric output control means includes logic relay means connected to the solenoid actuated pilot valves and to the plurality of control signal generating means for transmitting an actuating signal to energize the solenoid actuated pilot valve connected to the first selector valve when only one control signal is being generated and for transmitting actuating signals to both of the solenoid operated pilot valves when more than one control signal is being generated by the plurality of control signal generating means.

19. The control system of claim 18 including a source of electrical energy and wherein each of said control signal generating means includes an electrical switch connected to the source of electrical energy and the logic relay means, and a target capable of actuating said switch, one of the switch and the target being mounted on the frame and the other of the switch and target being mounted on the respective impactor.

20. The control system of claim 18 including means for transmitting a signal to the logic relay means only when the cumulative force on the ripper shanks is greater than a preselected level so that the solonoid actuated pilot valves are energized only when the cumulative force is greater than the preselected level.

21. A control system for an impact ripper having a frame, a plurality of laterally spaced hydraulically actuated impactors connected to the frame with each impactor having an impact element, and a plurality of ripper shanks connected to the frame for limited fore and aft movement relative thereto, each of said ripper shanks being individually associated with one of the impactors and positioned to engage that impactor when a force is imposed on the ripper shank and to receive impact blows from the impact element, said control system comprising:

- a source of pressurized fluid having at least first and second preselected volumetric output flow rates;
- a supply conduit connected to the source of pressurized fluid;
- a plurality of signal generating means, each being individually, operatively associated with a respective one of the ripper shanks for generating a control signal when a force greater than a predetermined level is applied to that ripper shank;
- means responsive to the discrete control signals from the generating means for controlling communication of fluid from the supply conduit to the impactors so that only the impactor(s) associated with the ripper shank(s) having a force greater than the predetermined level applied thereto receives (receive) fluid from the supply conduit, and
- means responsive to the number of control signals being generated by the plurality of generating means for controlling the volumetric output of the source of pressurized fluid so that only the first preselected volumetric output is communicated to the supply conduit when only one control signal is being generated and the second preselected volumetric output is communicated to the supply conduit when more than one control signal is being generated.

22. The control system of claim 21 wherein said communication controlling means includes a plurality of control valves connected to the supply conduit and being individually connected to the hydraulic impactors, each of said control valves being movable between a first position at which fluid communication therethrough is blocked and a second position at which fluid can communicate therethrough.

23. The control system of claim 22 wherein said control valves, are pilot operated control valves moved to the first position by pressurized pilot fluid directed thereto.

24. The control system of claim 23 wherein said communication controlling means includes a source of pressurized pilot fluid and a plurality of pilot valves connected to the source of pressurized pilot fluid and being individually connected to the control valves, each of said pilot valves being movable between a first position at which pressurized pilot fluid is directed to the respective control valve and a second position at which pressurized pilot fluid is blocked from the respective control valve.

25. The control system of claim 24 wherein said pilot valves are solenoid operated pilot valves with each solenoid operated pilot valve being moved to its second position when an actuating signal is directed thereto.

26. The control system of claim 25 wherein said communication controlling means includes logic relay means connected to the plurality of generating means and to the solenoid operated pilot valves for transmitting an actuating signal to energize the appropriate one of the solenoid operated pilot valves when only one control signal is received from the plurality of generating means and for transmitting a plurality of actuating signals to appropriate ones of the solenoid operated pilot valves when more than one control signal is received from the plurality of generating means.

27. The control system of claim 21 wherein said source of pressurized fluid includes a first fixed displacement pump, a first selector valve connected to the first pump and to the supply conduit, a second fixed displacement pump, and a second selector valve connected to the second pump and to the supply conduit, each of said selector valves being movable between a first position at which communication between the respective pump and supply conduit is blocked and a second position at which the respective pump is in communication with the supply conduit.

28. The control system of claim 27 wherein each said selector valves is pilot operated and is moved to the second position by pressurized pilot fluid directed thereto.

29. The control system of claim 28 wherein said volumetric output controlling means includes a source of pressurized pilot fluid and a pair of pilot valves connected to the source of pressurized pilot fluid and individually connected to the first and second selector valves, each of said pilot valves being movable between a first position blocking fluid communication between the source of pressurized pilot fluid and the respective selector valve and a second position at which the source of pressurized pilot fluid is in fluid communication with the respective selector valve.

30. The control system of claim 29 wherein said pilot valves are solenoid actuated pilot valves and said volumetric output control means includes logic relay means connected to the solenoid actuated pilot valves and to the plurality of control signal generating means for transmitting an actuating signal to energize the solenoid actuated pilot valve connected to the first selector valve when only one control signal is being generated and for transmitting actuating signals to both of the solenoid operated pilot valves when more than one control signal is being generated by the plurality of control signal generating means.

31. The control system of claim 30 including a source of electrical energy and wherein each of said control signal generating means includes an electrical switch connected to the source of electrical energy and the logic relay means, and a target capable of actuating said switch, one of the switch and the target being mounted on the frame and the other of the switch and target being mounted on the respective impactor.

32. The control system of claim 31 including a source of electrical energy connected to the signal generating means.

33. The control system of claim 21 wherein said impactors are movably mounted relative to the frame, and including means for resiliently resisting movement of the impactors relative to the frame.

34. The control system of claim 33 wherein said movement resisting means includes an elastomeric coupling connecting a respective one of the impactors to the frame.

35. The control system of claim 33 wherein said predetermined level of force on the ripper shanks is determined by the movement resistance means.

36. The control system of claim 33 wherein the ripper shanks are pivotally connected to the frame, and the frame includes a plurality of stops to limit aft movement of the ripper shanks.

* * * * *